United States Patent [19]

Bilda et al.

[11] Patent Number: 6,114,271
[45] Date of Patent: Sep. 5, 2000

[54] PROCESS FOR THE PREPARATION OF A POLYMERIZATION AND COPOLYMERIZATION OF ETHYLENE TO GIVE ULTRAHIGH MOLECULAR-WEIGHT ETHYLENE POLYMERS

[75] Inventors: Dieter Bilda, Frankfurt am Main; Ludwig Boehm, Hattersheim/Main, both of Germany

[73] Assignee: Ticona GmbH

[21] Appl. No.: 09/010,873

[22] Filed: Jan. 22, 1998

[51] Int. Cl.⁷ .................................................. B01J 21/10
[52] U.S. Cl. .................... 502/105; 502/104; 526/123.1; 526/352; 526/908; 526/909
[58] Field of Search ................................. 502/104, 105; 526/123.1, 908, 909, 352

[56] References Cited

U.S. PATENT DOCUMENTS

| | | |
|---|---|---|
| 4,138,540 | 2/1979 | Lutze et al. . |
| 4,259,466 | 3/1981 | Kortbeek et al. ........................ 526/142 |
| 4,497,904 | 2/1985 | Blaya et al. ............................ 502/104 |
| 4,933,393 | 6/1990 | Toyota et al. . |
| 4,962,167 | 10/1990 | Shiraishi et al. . |
| 5,349,033 | 9/1994 | Thum ....................................... 526/140 |

FOREIGN PATENT DOCUMENTS

| | | |
|---|---|---|
| 0 103 120 | 3/1984 | European Pat. Off. . |
| 0103120 | 3/1984 | European Pat. Off. . |
| 0 198 151 | 10/1986 | European Pat. Off. . |
| 0198151 | 10/1986 | European Pat. Off. . |
| 0 257 131 | 3/1988 | European Pat. Off. . |
| 0 349 146 | 1/1990 | European Pat. Off. . |
| 282 013 | 8/1990 | Germany . |
| 1 518 400 | 7/1978 | United Kingdom . |

*Primary Examiner*—David W. Wu
*Assistant Examiner*—Ling-Siu Choi
*Attorney, Agent, or Firm*—Connolly Bove Lodge & Hutz LLP

[57] ABSTRACT

Process for the preparation of a catalyst component for the polymerization and copolymerization of ethylene to give ultrahigh-molecular-weight ethylene polymers. Reaction of a Grignard compound with a halogenating agent, a titanium compound, a perhalogen compound and an electron-donor compound and subsequent comminution of the resultant solid to a mean particle size of from 0.5 to 5 $\mu$m gives a catalyst component which, together with an organoaluminum compound, results, in the polymerization and copolymerization of ethylene, in ultrahigh-molecular-weight ethylene polymers having a mean particle diameter of from 50 to 200 $\mu$m and a viscosity index of greater than 2,000 cm³/g. The mean particle diameter can be adjusted by means of the catalyst particle diameter and by means of the catalyst productivity.

18 Claims, No Drawings

PROCESS FOR THE PREPARATION OF A POLYMERIZATION AND COPOLYMERIZATION OF ETHYLENE TO GIVE ULTRAHIGH MOLECULAR-WEIGHT ETHYLENE POLYMERS

Process for the preparation of a catalyst system for the polymerization and copolymerization of ethylene to give ultrahigh molecular-weight ethylene polymers.

The invention relates to a process for the preparation of highly active catalysts for the low-pressure polymerization of α-olefins to give ultrahigh-molecular-weight products having a molecular weight $M_w$ of greater than or equal to $1 \times 10^6$ g/mol.

It is known that high-molecular-weight polyethylene can be synthesized by the low-pressure process using ZIEGLER catalysts prepared by reacting compounds of elements from sub-group IV to VI of the Periodic Table with organometallic compounds from main group I to III of the periodic table. The activity of these catalysts can be significantly increased by immobilization on $MgCl_2$ supports.

In addition to molecular properties, such as molecular weight and molecular weight distribution, morphological properties of the high-molecular-weight products, such as, for example, particle size and particle size distribution, are crucial for the processing properties and possible applications.

A known catalyst is prepared by reacting anhydrous $MgCl_2$ with ethanol, diethylaluminum chloride and titanium tetrachloride, and ultrahigh-molecular-weight polyethylene having an intrinsic viscosity of 27 dl/g is produced at polymerization temperatures of below 50° C. (cf. U.S. Pat. No. 4,933,393).

The polymer molecular weight can be regulated by adding alcohol (cf. GB 1,518,400 and U.S. Pat. No. 4,138,540).

Furthermore, a catalyst has been described in which two different titanium compounds are applied to an organic support and which allows the preparation of polyethylene having a molecular weight $M_w$ of about $2 \times 10^5$ g/mol (cf. DD 282 013).

Ultrahigh-molecular-weight polyethylene having a narrow particle size distribution can also be prepared using a catalyst based on oxygen-containing, inorganic Mg compounds (cf. EP 349 146).

Finally, a catalyst for the preparation of ultrahigh-molecular-weight polyethylene is described which can be prepared by reacting $MgCl_2$ with an alkoxy titanium compound, an aluminum trihalide and a tetraalkoxysilane (cf. U.S. Pat. No. 4,962,167).

In order to eliminate the disadvantage of polymers frequently being produced with an excessively large particle size, complex grinding processes are necessary for polyethylene (cf. U.S. Pat. No. 3,847,888).

The object of the invention was to develop a highly active catalyst system which is capable of preparing ultrahigh-molecular-weight ethylene polymers having a narrow particle size of distribution and a mean particle diameter in the range from 100 to 200 μm.

This object is achieved according to the invention by synthesizing, in the first step of the catalyst preparation, a primary solid which is the product of the reaction of a dialkylmagnesium compound with a halogenating agent and an electron-donor compound.

The invention thus relates to a process for the preparation of a catalyst component for the polymerization and copolymerization of ethylene to give ultrahigh-molecular-weight ethylene polymers in suspension or in the gas phase, which comprises a) reacting a magnesium compound of the formula I $$R^1\text{—Mg—}R^2, \qquad (I)$$

in which $R^1$ and $R^2$ are identical or different and are a $C_1$–$C_{20}$-alkyl radical, a $C_5$–$C_{20}$-cycloalkyl radical, a $C_6$–$C_{20}$-aryl radical or a $C_2$–$C_{20}$-alkenyl radical, in an inert hydrocarbon at a temperature of from 0 to 100° C. with b) a halogenating agent of the formula II $$R^3\text{—X}, \qquad (II)$$

in which X is a halogen atom and $R^3$ is a $C_1$–$C_{20}$-alkyl radical, a $C_5$–$C_{20}$-cycloalkyl radical, a $C_6$–$C_{20}$-aryl radical or a $C_2$–$C_2$-alkenyl radical, to give a solid product of the formula III $$(R^1,R^2,R^3)_n\text{—Mg—}X_{2-n} \qquad (III),$$

in which $R^1$, $R^2$ and $R^3$ are as defined above, and $0.5 \leq n \leq 1.5$,
and c) with a hydrocarbon-soluble titanium compound of the formula IV $$Z_m\text{—Ti—}Y_{4-m} \qquad (IV),$$

in which Z and Y are identical or different and are a halogen atom, a $C_1$–$C_6$-alkoxy group or a $C_1$–$C_{20}$-carboxyl radical, and m is a number from 0 to 4, together with a perhalogen compound of the formula V $$X_p\text{—C—}Q_{4-p} \qquad (V),$$

in which X is a halogen atom, Q is a halogen atom or a hydrogen atom and p is 3 or 4, in a Ti:Mg molar ratio of from 0.01 to 1 and in a Ti:perhalogen compound ratio of from 0.1 to 1, where
d) an electron-donor compound is present in one of reaction steps a), b) and c) in an amount of from 0.01 to 1 mol per mol of magnesium compound, and
e) the resultant solid is subsequently comminuted to a mean particle size of from 0.5 to 5 μm.

For the preparation of the catalyst according to the invention, a magnesium compound of the formula I $$R^1\text{—Mg—}R^2 \qquad (I),$$

in which $R^1$ and $R^2$ are identical and different and are a $C_1$–$C_{20}$-, preferably $C_2$–$C_8$-alkyl radical, a $C_5$–$C_{20}$-, preferably $C_6$–$C_8$-cycloalkyl radical, a $C_6$–$C_{20}$-, preferably $C_6$–$C_8$-aryl radical or a $C_2$–$C_{20}$-, preferably a $C_2$–$C_8$-alkenyl radical, is employed.

This magnesium compound is reacted with a halogenating agent of the formula II $$R^3\text{—X} \qquad (II),$$

in which X is a halogen atom, preferably Cl, and $R^3$ is a $C_1$–$C_{20}$-, preferably $C_2$–$C_8$-alkyl radical, a $C_1$–$C_{20}$-, preferably $C_6$–$C_8$-cycloalkyl radical, a $C_6$–$C_{20}$-, preferably $C_6$–$C_8$-aryl radical or a $C_2$–$C_{20}$-, preferably $C_2$–$C_8$-alkenyl radical.

The reaction is carried out in a hydrocarbon having 4 to 12 carbon atoms or a mixture of such hydrocarbons. Examples of suitable hydrocarbons are butanes, hexanes, octanes, decanes, cyclohexanes and benzine fractions which contain these hydrocarbons. The reaction temperature is from 0 to 100° C.

The product is a solid of the formula III $$(R^1, R^2, R^3)—Mg—X_{2-n} \qquad (III),$$

in which $R^1$, $R^2$ and $R^3$ are as defined above, and $0.5 \leq n \leq 1.5$.

Examples of these reaction products are:
n-$C_4H_9$MgCl, i-$C_4H_9$MgCl, $C_6H_5$MgCl, $C_6H_5CH_2$MgCl, $C_3H_7$MgCl, $CH_2$=CHMgCl or mixtures of these compounds.

For achieving the object, the use of an electron-donor compound has proven necessary. Suitable donor compounds in addition to esters of carboxylic acids, are ethers, ketones, amides and phosphorus compounds. Examples of typical esters are alkyl benzoates, alkyl phthalates and lkyl anisates.

The electron-donor compound is preferably reacted with the support before immobilization of the titanium compound on the catalyst support (III). However, it is also possible to simultaneously react the support, donor and titanium compound or to allow the titanium compound as an adduct with the electron donors to react with the support.

The content of donor component is from 0.01 to 1 mol, preferably from 0.05 to 0.5 mol, per mol of magnesium. The molar ratio between the electron donor and titanium compound is in the range from 0.1 to 10, preferably 0.5 to 1.5.

The adduct of the Grignard compound (III) with the electron donor is reacted with a hydrocarbon-soluble titanium compound of the formula IV $$Z_m—Ti—Y_{4-m} \qquad (IV),$$

in which Z and Y are identical or different and are a halogen atom, preferably Cl, or a $C_1$–$C_6$-, preferably $C_1$–$C_4$-alkoxy group or a $C_1$–$C_{20}$-preferably $C_1$–$C_8$-carboxyl radical, and m is a number from 0 to 4, together with a perhalogen compound of the formula V $$X_p—C—Q_{4-p} \qquad [V],$$

in which X is a halogen atom, preferably Cl, Q is a halogen atom, preferably Cl, or a hydrogen atom, and p is 3 or 4, in an inert hydrocarbon at a temperature of from 0 to 100° C. The Ti:Mg molar ratio is in the range from 0.01 to 1, preferably from 0.02 to 0.1, and the Ti:perhalogen compound ratio is in the range from 0.1 to 1.

The immobilisation of titanium is followed by shear treatment, for example grinding, of the catalyst solid (component a) which allows the particle size of the catalyst particles to be adjusted to a mean diameter in the range from 0.5 to 5 μm, depending on the duration of the shear treatment.

Component a can be reacted directly as a suspension with component b; however, it can also be first isolated as a solid, stored and re-suspended for later further use.

Component b is preferably an organoaluminum compound. Suitable organoaluminum compounds are chlorine-containing organoaluminum compounds, dialkylaluminum monochlorides of the formula $R^4{}_2AlCl$ or alkylaluminum sesquichlorides of the formula $R^4{}_3Al_2Cl_3$, in which $R^4$ is an alkyl radical having 1 to 16 carbon atoms. Examples which may be mentioned are $(C_2H_5)_2AlCl$, $(iC_4H_9)_2AlCl$ and $(C_2H_5)_3Al_2Cl_3$. It is also possible to employ mixtures of these compounds.

The organoaluminum compounds employed are particularly preferably chlorine-free compounds. Compounds which are suitable for this purpose are on the one hand products of the reaction of trialkylaluminum compounds or dialkylaluminum dihydrides containing hydrocarbon radicals having 1 to 6 carbon atoms, preferably $Al(iC_4H_9)_3$ or $Al(iC_4H_9)_2H$, with diolefines containing 4 to 20 carbon atoms, preferably isoprene. An example which may be mentioned is isoprenyl aluminum.

On the other hand, suitable chlorine-free organoaluminum compounds of this type are trialkylaluminum $AlR^4{}_3$ or dialkylaluminum hydrides of the formula $AlR^4{}_2H$, in which $R^4$ is an alkyl radical having 1 to 16 carbon atoms. Examples are $Al(C_2H_5)_3$, $Al(C_2H_5)_2H$, $Al(C_3H_7)_2H$, $Al(iC_4H_9)_3$, $Al(iC_4H_9)_2H$, $Al(C_8H_{17})_3$, $Al(C_{12}H_{25})_3$, $Al(C_2H_5)(C_{12}H_{25})_2$ and $Al(iC_4H_9)(C_{12}H_{25})_2$.

It is also possible to employ mixtures of organometallic compounds of metals from group I, II or III of the Periodic Table, in particular mixtures of different organoaluminum compounds. The following mixtures may be mentioned by way of example:
$Al(C_2H_5)_3$ and $Al(iC_4H_9)_3$, $Al(C_2C_5)_2Cl$ and $Al(C_8H_{17})_3$, $Al(C_2H\ )_3$, $Al(C_8H_{17})_3$, $Al(C_4H_9)_2H$ and $Al(C_8H_{17})_3$ $Al(iC_4H_9)_3$ and $Al(C_8H_{17})_3$, $Al(C_2H_5)_3$ and $Al(C_{12}H_{25})_3$, $Al(iC_4H_9)_3$ and $Al(C_{12}H_{25})_3$, $Al(C_2H_5)_3$ and $Al(C_{15}H_{33})_3$, $Al(C_3H_7)_3$ and $Al(C_{18}H_{37})_2(iC_4H_9)$, $Al(C_2H_5)_3$ and isoprenylaluminum (product of the reaction of isoprene with $Al(iC_4H_9)_3$ or $Al(iC_4H_9)_2H$).

The mixing of component a and component b can be carried out before the polymerization in a stirred reactor at a temperature of −30 to 150° C., preferably from −10 to 120° C. It is also possible to combine the two components directly in the polymerization reactor at a temperature of 20 to 200° C. However, the addition of component b can also be carried out in two steps by preactivating component a, before the polymerization reaction, using some of components b at a temperature of −30 to 150° C. and introducing the remainder of components b into the polymerization reactor at a temperature of from 20 to 200° C.

The polymerization catalyst to be used according to the invention is employed for the polymerization of 1-olefins of the formula $R^5$—CH=$CH_2$, in which $R^5$ is a hydrogen atom or an alkyl radical having 1 to 10 carbon atoms, for example ethylene, propylene, 1-butene, 1-hexene, 4-methyl-1-pentene or 1-octene.

It is preferred to polymerize ethylene alone or as a mixture of at least 90% by weight, in particular at least 95% by weight, of ethylene and a maximum of 10% by weight, in particular a maximum of 5% by weight, of another 1-olefin of the above formula.

The polymerization is carried out in a known manner in solution, in suspension or in the gas phase, continuously or batchwise, in one or more steps, at a temperature of from 20 to 200° C., preferably from 50 to 150° C. The pressure is from 0.5 to 50 bar. The polymerization is preferably carried out in the pressure range of from 5 to 30 bar which is particularly interesting to industry.

Component a is used in a concentration, based on transition metal, of from 0.0001 to 1 mmol, preferably from 0.0005 to 0.1 mmol, of transition metal per $dm^3$ of dispersion medium. The organometallic compound is used in a concentration of from 0.1 to 5 mmol, preferably from 0.5 to 4 mmol, per $dm^3$ of dispersion medium. In principle, however, higher concentrations are also possible.

The suspension polymerization is carried out in an inert dispersion medium which is customary for the Ziegler low-pressure process, for example in an aliphatic or cycloaliphatic hydrocarbon; examples of these which may be mentioned are butane, pentane, hexane, heptane, isooctane, cyclohexane and methylcyclohexane. It is furthermore possible to use benzine or hydrogenated diesel oil fractions which have been carefully freed from oxygen, sulfur compounds and moisture.

The gas-phase polymerization can be carried out directly or after prepolymerization of the catalyst in a suspension process.

The molecular weight of the polymer is regulated in a known manner, preferably using hydrogen.

An advantage of the process according to the invention is that the catalyst component a prepared according to the invention allows the preparation of polymers having a mean particle diameter of from 50 to 200 µm and that this mean particle diameter can be adjusted by means of the catalyst particle diameter and by means of the catalyst productivity.

In addition, ultrahigh-molecular-weight polyethylene having a viscosity index of greater than 2000 cm$^3$/g can be prepared.

The examples below illustrate the invention.
The following abbreviations are used:

| | | |
|---|---|---|
| CP | Catalyst productivity | [kg of PE/mmol of Ti] |
| CTY$_{red}$ | Reduced catalyst time yield | [kg of PE/mmol of Ti · h · bar] |
| d$_{50}$ | Mean particle size (obtained by vibrating screen fractionation) | [µm] |
| BD | Polymer bulk density (measured in accordance with DIN 53 468) | [g/dm$^3$] |
| VI | Viscosity index (measured in accordance with DIN 53 728) | [cm$^3$/g] |

EXAMPLE 1

0.05 mol of t-butyl chloride in 50 cm$^3$ of a benzine fraction were added dropwise over the course of one hour at 80° C. under inert conditions to a solution of 0.05 mol of n-butyl-s-butylmagnesium (from LITHCO) in 50 cm$^3$ of the benzine fraction. A white, finely divided solid formed. The batch was stirred for a further half an hour, giving suspension a$_1$. 0.005 mol of diisobutyl phthalate, dissolved in 20 cm$^3$ of the benzine fraction, as electron donor was subsequently added dropwise to suspension a$_1$, and the mixture was stirred at 80° C. for half an hour, giving suspension a$_2$. Titanium tetrachloride (0.005 mol) and tetrachloromethane (0.01 mol) were dissolved together in 50 cm$^3$ of the benzine fraction, and the solution was added dropwise over the course of one hour at a reaction temperature of 80° C. to suspension a$_2$ (→suspension a$_3$). The dark-brown suspension was stirred at 80° C. for a further 2 hours, cooled to room temperature, and ground for 5 hours in the reaction flask by means of glass beads with a diameter of 4 mm. The titanium content of the catalyst suspension was 27.5 mmol/dm$^3$. The proportion soluble titanium compounds was 2.2% by weight of the total titanium content. The catalyst particles had a mean diameter of 2.1 µm, according to optical microscopy measurements. The polymerization of ethylene was carried out at constant pressure in a 1.5 dm$^3$ bench autoclave in 800 cm$^3$ of a benzine fraction at a stirrer speed of 750 rpm and at an ethylene partial pressure of 4 bar for a period of 2 hours. The polymerization temperature was 80° C. The cocatalyst employed was 1 mmol of triisobutylaluminum. The suspension of catalyst component a was diluted to a concentration of 1 mmol of Ti/dm$^3$. Of this dilute suspension, 1 cm$^3$ was used for the polymerization. The reaction was terminated by decompression and cooling, and the polymer was separated from the dispersion medium by filtration and drying. 164 g of polyethylene were obtained, corresponding to a CP of 164 kg of PE/mmol of Ti and a CTY$_{red}$ of 20.5 kg of PE/mmol of Ti·h·bar. The VI was 2,750 cm$^3$/g, and the product had a bulk density of 310 g/dm$^3$ and a d$_{50}$ of 143 µm.

EXAMPLE 2

0.05 mol of t-butyl chloride in 50 cm$^3$ of a benzine fraction were added dropwise over the course of one hour at 80° C. under inert conditions to a solution of 0.05 mol of n-butyl-2-butylmagnesium in 50 cm$^3$ of a benzine fraction. A white, finely divided solid formed. The batch was stirred for a further half an hour, giving suspension a$_1$. 0.005 mol of ethyl benzoate as electron donor in 20 cm$^3$ of the benzine fraction, were subsequently added dropwise to suspension a$_1$, and the mixture was stirred for half an hour at 80° C. (suspension a$_2$). Titanium tetrachloride (0.005 mol) and tetrachloromethane (0.01 mol) were dissolved together in 50 cm$^3$ of the benzine fraction, and the mixture was added dropwise to suspension a$_2$ over the course of one hour at a reaction temperature of 80° C. (suspension a$_3$). The dark-brown suspension was kept at 80° C. for a further 2 hours, cooled to room temperature, and ground for 5 hours in the reaction vessel by means of glass beads with a diameter of 4 mm. The titanium content of the catalyst suspension was 26.8 mmol/dm$^3$. The proportion of soluble titanium compounds was 2.9% by weight of the total titanium content. The catalyst particles had a mean diameter of 2.4 µm, according to optical microscopy measurements.

The polymerization was carried out as described in Example 1. 142 g of polyethylene were obtained, corresponding to a CP of 142 kg of PE/mmol of Ti and a CTY$_{red}$ of 17.8 kg of PE/mmol of Ti·h·bar. The VI was 2,580 cm$^3$/g, and the product had a bulk density of 302 g/dm$^3$ and a d$_{50}$ of 129 µm.

EXAMPLE 3

The preparation of the catalyst component was carried out as in Example 1, with the exception that the tetrachloromethane was replaced by the same amount of chloroform.

The polymerization was carried out as described in Example 1.

168 g of polyethylene were obtained, corresponding to a CP of 168 kg of PE/mmol of Ti and a CTY$_{red}$ of 21.0 kg of PE/mmol of Ti·h·bar. The VI was 2,720 cm$^3$/g, and the product had a bulk density of 315 g/dm$^3$ and a d$_5$D of 141µm.

EXAMPLE 4

The preparation of the catalyst component a was carried out as in Example 1, with the exception that the titanium tetrachloride was replaced by the same amount of TiCl$_3$(OC$_3$H$_7$).

The polymerization was carried out as described in Example 1. 118 g of polyethylene were obtained, corresponding to a CP of 118 kg of PE/mmol of Ti and a CTY$_{red}$ of 14.8 kg of PE/mmol of Ti·h·bar. The VI was 2,840 cm$^3$/g, and the product had a bulk density of 298 g/dm$^3$ and a d$_{50}$ of 125 µm.

EXAMPLE 5

The preparation of the catalyst component was carried out as in Example 1, with the difference that the n-butyl-s-butylmagnesium was replaced by the same amount of n-butyl-n-octylmagnesium (BOMAG-A from Schering).

The polymerization was carried out as described in Example 1. 176 g of polyethylene were obtained, corresponding to a CP of 176 kg of PE/mmol of Ti and a CTY$_{red}$ of 22.0 kg of PE/mmol of Ti·h·bar. The VI was 2,670 cm$^3$/g, and the product had a bulk density of 323 g/dm$^3$ and a d$_{50}$ of 152 µm.

EXAMPLE 6

The preparation of the catalyst component was carried out as in Example 5, with the difference that the catalyst suspension after grinding was washed twice with 100 cm³ of the benzine fraction. The titanium content of the catalyst suspension was 23.7 mmol/dm³. No soluble titanium compounds were detectable in the residual solution.

The polymerization was carried out as described in Example 1. 153 g of polyethylene were obtained, corresponding to a CP of 153 kg of PE/mmol of Ti and a $CTY_{red}$ of 19.1 kg of PE/mmol of Ti·h·bar. The VI was 2,810 cm³/g, and the product had a bulk density of 295 g/dm³ and a $d_{50}$ of 148 μm.

EXAMPLE 7

The preparation of catalyst component a was carried out as in Example 5.

The polymerization was carried out as described in Example 1, with the difference that the polymerization temperature was reduced to 70° C. 117 g of polyethylene were obtained, corresponding to a CP of 117 kg of PE/mmol of Ti and a $CTY_{red}$ of 14.6 kg of PE/mmol of Ti·h·bar. The VI was 3,110 cm³/g, and the product had a bulk density of 318 g/dm³ and a $d_{50}$ of 127 μm.

EXAMPLE 8

The preparation of the catalyst component was carried out as in Example 5.

The polymerization was carried out as described in Example 1, with the difference that triisobutylaluminum was replaced by the same amount (1 mmol) of triethylaluminum as cocatalyst. 152 g of polyethylene were obtained, corresponding to a CP of 152 kg of PE/mmol of Ti and a $CTY_{red}$ of 19.0 kg of PE/mmol of Ti·h·bar. The VI was 2,180 cm³/g, and the product had a bulk density of 321 g/dm³ and a $d_{50}$ of 148 μm.

EXAMPLE 9

0.5 mol of t-butyl chloride in 100 cm³ of a benzine fraction was added dropwise over the course of one hour at 80° C. under inert conditions to a solution of 0.5 mol of n-butyl-n-octyl magnesium (BOMAG-A from Schering; 20% strength in heptane). A white, finely divided solid formed. The batch was stirred for a further hour at 80° C. (suspension $a_1$). 0.03 mol of diisobutyl phthalate, as electron donor in 50 cm³ of the benzine fraction were subsequently added dropwise to suspension $a_1$, and the mixture was stirred at 80° C. for one hour (suspension $a_2$). Titanium tetrachloride (0.05 mol) and tetrachloromethane (0.1 mol) were dissolved together in 100 cm³ of the benzine fraction, and the solution was added dropwise to suspension $a_2$ over the course of one hour at a reaction temperature of 80° C. (suspension $a_3$). The dark-brown suspension was stirred at 80° C. for a further 2 hours, cooled to room temperature, and ground for 10 hours by means of glass beads with a diameter of 4 mm. The titanium content of the catalyst suspension was 58.6 mmol/dm³. The proportion of soluble titanium compounds was 4.9% by weight of the total titanium content. The catalyst particles had a mean diameter of 1.5 μm. The polymerization of ethylene was carried out in a 150 dm³ reactor in 100 dm³ of a benzine fraction with 1.2 cm³ of the abovementioned catalyst component a, corresponding to 0.07 mmol of titanium, with 0.15 mmol of triisobutylaluminum as cocatalyst. The ethylene gas inlet rate was 5.0 kg/h. The polymerization temperature was 80° C. The reaction was terminated by decompression and cooling when an overall pressure of 9.0 bar had been reached, and the polymer was separated from the dispersion medium by filtration and drying. The polymerisation time was 3.75 hours. 18.5 kg of polyethylene were obtained, corresponding to a CP of 264 kg of PE/mmol of Ti. The product had a VI of 2,650 cm³/g, a bulk density of 296 g/dm³ and a $d_{50}$ of 147 μm.

EXAMPLE 10

The preparation of catalyst component a was carried out as in Example 5.

A gas-phase polymerization of ethylene was carried out in a 2 dm³ steel autoclave with polished walls. The fluidized bed was generated mechanically with the aid of a double-helix ribbon impeller fitted to the contours of the autoclave wall, with the introduction of 10 g of polyethylene powder as seed bed. First the cocatalyst (2 mmol of triisobutylaluminum) and then 2 cm³ of the catalyst suspension (2 mmol of Ti) were metered into the autoclave via a pressure burette. Argon was injected and the system evacuated, this operation was repeated a number of times, and the polymerization was carried out for 2 hours at an ethylene partial pressure of 10 bar and a temperature of 80° C. and was terminated by releasing the pressure in the autoclave.

241 g of polyetheylene were obtained, corresponding to a CP of 120 kg of PE/mmol of Ti and a $CTY_{red}$ of 6.0 kg of PE/mmol of. Ti·h·bar. The VI was 2,630 cm³/g, and the product had a bulk density of 348 g/dm³ and a $d_{50}$ of 104 μm.

What is claimed is:

1. A process for the preparation of a catalyst component for the polymerization or copolymerization of ethylene to give an ultrahigh-molecular-weight ethylene polymer in suspension or in the gas phase, which consists essentially of (A) reacting a magnesium compound of the formula I $$R^1\text{—Mg—}R^2 \quad (I)$$

in which $R^1$ and $R^2$ are identical or different and are a $C_1$–$C_{20}$-alkyl radical, a $C_5$–$C_{20}$-cycloalkyl radical, a $C_6$–$C_{20}$-aryl radical or a $C_2$–$C_{20}$-alkenyl radical, in an inert hydrocarbon at a temperature of from 0 to 100° C. with a halogenating agent of the formula II $$R^3\text{—X,} \quad (II)$$

in which X is a halogen atom and $R^3$ is a $C_1$–$C_{20}$-alkyl radical, a $C_5$–$C_{20}$-cycloalkyl radical, a $C_6$–$C_{20}$-aryl radical or a $C_2$–$C_{20}$-alkenyl radical, to give a solid product of the formula III $$(R^1, R^2, R^3)_n\text{—Mg—}X_{2-n} \quad (III),$$

in which $R^1$, $R^2$ and $R^3$ are as defined above, and $0.5 \leq n \leq 1.5$, and (B) reacting the solid product of the formula III with a hydrocarbon-soluble titanium compound of the formula IV $$Z_m\text{—Ti—}Y_{4-m} \quad (IV),$$

in which Z and Y are identical or different and are a halogen atom, a $C_1$–$C_6$-alkoxy group or a $C_1$–$C_{20}$-carboxyl radical, and m is a number from 0 to 4, together with a perhalogen compound of the formula V $$X_p\text{—}C\text{—}Q_{4-p} \quad (V),$$

in which X is a halogen atom, Q is a halogen atom or a hydrogen atom and p is 3 or 4, in a Ti:Mg molar ratio of from 0.01 to 1 and in a Ti:perhalogen compound ratio of from 0.1 to 1, wherein an electron-donor compound is diisobutyl phthalate, which is present in one of reaction steps (A) and (B) in an amount of from 0.01 to 1 mol per mol of magnesium compound, and and the resultant solid is subsequently comminuted to a mean particle size of from 0.5 to 5 $\mu$m.

2. The process as claimed in claim 1, wherein the molar ratio between the electron donor and the titanium compound is in the range from 0.1 to 10.

3. The process as claimed in claim 1, wherein $R^1$ and $R^2$ are identical or different and are a $C_2$–$C_8$-alkyl radical a $C_6$–$C_8$-cycloalkyl radical, a $C_6$–$C_8$-aryl radical or a $C_2$–$C_8$-alkenyl radical.

4. The process as claimed in claim 3, wherein X is chlorine and $R^3$ is a $C_2$–$C_8$-alkyl radical, a $C_6$–$C_8$-cycloalkyl radical, a $C_6$–$C_8$-aryl radical or a $C_2$–$C_8$-alkenyl radical.

5. The process as claimed in claim 4, wherein the inert hydrocarbon is a hydrocarbon having 4 to 12 carbons or a mixture of such hydrocarbons.

6. The process as claimed in claim 5, wherein the hydrocarbon is butane, hexane, octane, decane or cyclohexane.

7. The process as claimed in claim 5, wherein the product of formula III is n-$C_4H_9$MgCl, i-$C_4H_9$MgCl, $C_6H_5CH_2$MgCl, $C_3H_7$MgCl, $CH_2$=CHMgCl or mixtures of these compounds.

8. The process as claimed in claim 7, wherein the content of the donor component is from 0.05 to 0.5 mol per mol of magnesium.

9. The process as claimed in claim 8, wherein the molar ratio between the electron donor and the titanium compound is in the range from 0.5 to 1.5.

10. The process as claimed in claim 9, wherein Z and Y are identical or different and are a chlorine atom, a $C_1$–$C_4$-alkoxy group or a $C_1$–$C_8$-carboxyl radical; X is chlorine and Q is chlorine.

11. The process as claimed in claim 10, wherein the Ti:Mg molar ratio is from 0.02 to 0.1.

12. The process as claimed in claim 1, wherein Z and Y are identical or different and are a $C_1$–$C_4$-alkoxy group or a $C_1$–$C_8$-carboxy radical.

13. The process as claimed in 12, wherein Q is hydrogen and p is 3.

14. A process for the preparation of a catalyst component for the polymerization or copolymerization of ethylene to give an ultrahigh-molecular-weight ethylene polymer in suspension or in the gas phase, which consists of (A) reacting a magnesium compound of the formula I $$R^1\text{—Mg—}R^2 \quad (I)$$

in which $R^1$ and $R^2$ are identical or different and are a $C_1$–$C_{20}$-alkyl radical, a $C_5$–$C_{20}$-cycloalkyl radical, a $C_6$–$C_{20}$-aryl radical or a $C_2$–$C_{20}$-alkenyl radical, in an inert hydrocarbon at a temperature of from 0 to 100° C.

with a halogenating agent of the formula II $$R^3\text{—X,} \quad (II)$$

in which X is a halogen atom and $R^3$ is a $C_1$–$C_{20}$-alkyl radical, a $C_5$–$C_{20}$-cycloalkyl radical, a $C_6$–$C_{20}$-aryl radical or a $C_2$–$C_{20}$-alkenyl radical, to give a solid product of the formula III $$(R^1R^2, R^3)_n\text{—Mg—}X_{2-n} \quad (III),$$

in which $R^1$, $R^2$ and $R^3$ are as defined above, and $0.5 \leq n \leq 1.5$, and (B) reacting the solid product of the formula III with a hydrocarbon-soluble titanium compound of the formula IV $$Z_m\text{—T—}Y_{4-m} \quad (IV),$$

in which Z and Y are identical or different and are a halogen atom, a $C_1$–$C_6$-alkoxy group or a $C_1$–$C_{20}$-carboxyl radical, and m is a number from 0 to 4, together with a perhalogen compound of the formula V $$X_p\text{—C—}Q_{4-p} \quad (V),$$

in which X is a halogen atom, Q is a halogen atom or a hydrogen atom and p is 3 or 4, in a Ti:Mg molar ratio of from 0.01 to 1 and in a Ti:perhalogen compound ratio of from 0.1 to 1, wherein an electron-donor compound is diisobutyl phthalate, which is present in one of reaction steps (A) and (B) in an amount of from 0.01 to 1 mol per mol of magnesium compound, and the resultant solid is subsequently comminuted to a mean particle size of from 0.5 to 5 $\mu$m.

15. A catalyst component prepared by the process as claimed in claim 1.

16. A mixed catalyst comprising:

(a) the transition metal catalyst component as claimed in claim 15, and (b) an organoaluminum component.

17. The mixed catalyst as claimed in claim 16, wherein the organoaluminum component is a dialkyl aluminum monochloride of the formula $R^4{}_2AlCl$ or an alkyl aluminum sesquichloride of the formula $R^4{}_3Al_2C_6$ in which $R^4$ is an alkyl radical having 1 to 16 carbon atoms.

18. The mixed catalyst as claimed in claim 16, wherein the organoaluminum component is a trialkyl aluminum of the formula $AlR^4{}_3$ or a dialkyl aluminum hydride of the formula $AlR^4{}_2H$ in which $R^4$ is an alkyl radical having 1 to 16 carbon atoms.

* * * * *

UNITED STATES PATENT AND TRADEMARK OFFICE
CERTIFICATE OF CORRECTION

PATENT NO. : 6,114,271  
DATED : September 5, 2000  
INVENTOR(S) : Dieter Bilda et al.

Page 1 of 1

It is certified that error appears in the above-identified patent and that said Letters Patent is hereby corrected as shown below:

Column 10,
Line 48, (Claim 17, line 4), "$R^4{}_3Al_2C_6$" should read -- $R^4{}_3 Al_2Cl_3$ --.

Signed and Sealed this

Twenty-eighth Day of August, 2001

*Attest:*

*Attesting Officer*

NICHOLAS P. GODICI
*Acting Director of the United States Patent and Trademark Office*